United States Patent
Sim

(10) Patent No.: US 11,700,989 B2
(45) Date of Patent: Jul. 18, 2023

(54) MOBILE ROBOT USING ARTIFICIAL INTELLIGENCE AND CONTROLLING METHOD THEREOF

(71) Applicant: LG ELECTRONICS INC., Seoul (KR)

(72) Inventor: Miyoung Sim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 271 days.

(21) Appl. No.: 16/924,848

(22) Filed: Jul. 9, 2020

(65) Prior Publication Data
US 2021/0007572 A1   Jan. 14, 2021

(30) Foreign Application Priority Data
Jul. 11, 2019 (KR) .......................... 10-2019-0083998

(51) Int. Cl.
*A47L 11/40* (2006.01)
*G05D 1/02* (2020.01)

(52) U.S. Cl.
CPC ....... *A47L 11/4061* (2013.01); *A47L 11/4011* (2013.01); *G05D 1/0219* (2013.01);
(Continued)

(58) Field of Classification Search
CPC .............. A47L 11/4061; A47L 11/4011; A47L 2201/04; A47L 2201/06; A47L 9/2805;
(Continued)

(56) References Cited

U.S. PATENT DOCUMENTS 5,677,836 A * 10/1997 Bauer .................... G01S 13/89
                                                            701/26
5,684,695 A * 11/1997 Bauer .................. G05D 1/0274
                                                            701/28
(Continued)

FOREIGN PATENT DOCUMENTS

JP    H06-327599    11/1994
JP    2010-225125    10/2010
(Continued)

OTHER PUBLICATIONS

International Search Report dated Oct. 30, 2020 issued in International Application No. PCT/KR2020/008724.
(Continued)

*Primary Examiner* — Bhavesh V Amin
(74) *Attorney, Agent, or Firm* — Ked & Associates LLP

(57) ABSTRACT

A mobile robot of the present disclosure includes: a traveling unit configured to move a main body; a cleaning unit configured to perform a cleaning function; a sensing unit configured to sense a surrounding environment; an image acquiring unit configured to acquire an image outside the main body; and a controller configured to generate a distance map indicating distance information from an obstacle for a cleaning area based on information detected and the image through the sensing unit and the image acquiring unit, divide the cleaning area into a plurality of detailed areas according to the distance information of the distance map and control to perform cleaning independently for each of the detailed areas. Therefore, the area division is optimized for the mobile robot traveling in a straight line by dividing the area in a map showing a cleaning area.

12 Claims, 8 Drawing Sheets

(52) U.S. Cl.
CPC ......... G05D 1/0238 (2013.01); G05D 1/0274 (2013.01); A47L 2201/04 (2013.01); G05D 2201/0203 (2013.01)

(58) Field of Classification Search
CPC ........ A47L 9/2857; A47L 9/2873; A47L 9/02; A47L 2201/02; A47L 9/2831; A47L 9/2852; A47L 9/2894; A47L 11/4063; G05D 1/0274; G05D 1/0246; G05D 1/0212; G05D 1/0219; G05D 1/0238; G05D 2201/0203; B25J 11/0085; B25J 13/08; B25J 19/02; B25J 9/1664; B25J 9/1679

See application file for complete search history.

(56) References Cited

U.S. PATENT DOCUMENTS

| | | | | |
|---|---|---|---|---|
| 5,793,934 | A * | 8/1998 | Bauer | G05D 1/0274 700/250 |
| 8,676,429 | B2 * | 3/2014 | Nakano | G05D 1/024 701/25 |
| 11,175,670 | B2 | 11/2021 | Artes et al. | |
| 11,288,836 | B2 | 3/2022 | Park et al. | |
| 11,399,687 | B2 * | 8/2022 | Cheong | G05D 1/0088 |
| 2002/0015521 | A1 * | 2/2002 | Kim | G06V 20/10 382/153 |
| 2003/0030398 | A1 | 2/2003 | Jacobs et al. | |
| 2004/0039498 | A1 * | 2/2004 | Ollis | G05D 1/0257 701/23 |
| 2004/0204792 | A1 * | 10/2004 | Taylor | A47L 9/2826 700/245 |
| 2005/0000543 | A1 * | 1/2005 | Taylor | G05D 1/0274 134/18 |
| 2005/0010331 | A1 * | 1/2005 | Taylor | G05D 1/0274 318/568.12 |
| 2005/0273967 | A1 * | 12/2005 | Taylor | G05D 1/0246 15/319 |
| 2006/0020369 | A1 * | 1/2006 | Taylor | A47L 9/2884 318/568.12 |
| 2007/0061043 | A1 * | 3/2007 | Ermakov | G05D 1/024 700/263 |
| 2008/0273791 | A1 * | 11/2008 | Lee | G05D 1/0274 382/173 |
| 2009/0281661 | A1 * | 11/2009 | Dooley | B60L 15/2036 901/1 |
| 2010/0070078 | A1 | 3/2010 | Kong et al. | |
| 2010/0324731 | A1 | 12/2010 | Letsky | |
| 2010/0328457 | A1 | 12/2010 | Lee | |
| 2011/0137461 | A1 | 6/2011 | Kong et al. | |
| 2012/0106829 | A1 | 5/2012 | Lee et al. | |
| 2012/0143372 | A1 | 6/2012 | Roh | |
| 2013/0138247 | A1 * | 5/2013 | Gutmann | G01S 17/06 901/1 |
| 2014/0009748 | A1 * | 1/2014 | Leonessa | G05D 1/024 356/4.03 |
| 2014/0142891 | A1 * | 5/2014 | Lucidarme | G05D 1/024 702/159 |
| 2015/0242806 | A1 * | 8/2015 | Cousins | G06Q 10/087 700/237 |
| 2016/0005229 | A1 * | 1/2016 | Lee | G06T 11/60 345/419 |
| 2016/0069691 | A1 | 3/2016 | Fong et al. | |
| 2016/0132056 | A1 * | 5/2016 | Yoshino | G05D 1/0274 701/23 |
| 2016/0167226 | A1 * | 6/2016 | Schnittman | G06V 20/10 901/1 |
| 2016/0302638 | A1 | 10/2016 | Haegermarck | |
| 2017/0239813 | A1 | 8/2017 | Vicenti | |
| 2018/0177361 | A1 | 6/2018 | Song et al. | |
| 2018/0239355 | A1 * | 8/2018 | Lee | G08G 1/166 |
| 2018/0267552 | A1 * | 9/2018 | Artes | G05D 1/0274 |
| 2018/0289228 | A1 | 10/2018 | Xue et al. | |
| 2018/0296049 | A1 * | 10/2018 | Izawa | G05D 1/0246 |
| 2018/0306587 | A1 | 10/2018 | Holz | |
| 2018/0314254 | A1 | 11/2018 | Bauer et al. | |
| 2018/0361583 | A1 | 12/2018 | Williams et al. | |
| 2019/0011929 | A1 * | 1/2019 | Maeno | G05D 1/0225 |
| 2019/0025838 | A1 * | 1/2019 | Artes | G05D 1/0274 |
| 2019/0035100 | A1 * | 1/2019 | Ebrahimi Afrouzi | G06V 20/10 |
| 2019/0061157 | A1 * | 2/2019 | Suvarna | G05D 1/0044 |
| 2019/0090712 | A1 * | 3/2019 | Cheong | A47L 11/4061 |
| 2019/0094869 | A1 * | 3/2019 | Artes | G05D 1/0238 |
| 2019/0094870 | A1 * | 3/2019 | Afrouzi | G05D 1/0274 |
| 2019/0113927 | A1 | 4/2019 | England et al. | |
| 2019/0220020 | A1 | 7/2019 | Macias et al. | |
| 2019/0310653 | A1 | 10/2019 | Lee et al. | |
| 2019/0332121 | A1 | 10/2019 | Kim et al. | |
| 2019/0339703 | A1 | 11/2019 | Bao et al. | |
| 2020/0393545 | A1 | 12/2020 | Shani et al. | |
| 2021/0048312 | A1 | 2/2021 | Choi et al. | |
| 2022/0137637 | A1 | 5/2022 | Baldini et al. | |

FOREIGN PATENT DOCUMENTS

| | | |
|---|---|---|
| JP | 2012-011200 | 1/2012 |
| JP | 2014-123200 | 7/2014 |
| JP | 2017-083663 | 5/2017 |
| JP | 2019-505256 | 2/2019 |
| KR | 10-0611328 | 8/2006 |
| KR | 10-0715609 | 5/2007 |
| KR | 10-0791384 | 1/2008 |
| KR | 10-2010-0031878 | 3/2010 |
| KR | 10-2010-0070582 | 6/2010 |
| KR | 10-2011-0000848 | 1/2011 |
| KR | 10-2012-0047137 | 5/2012 |
| KR | 10-1179075 | 9/2012 |
| KR | 10-1242252 | 3/2013 |
| KR | 10-2013-0112507 | 10/2013 |
| KR | 10-2014-0009737 | 1/2014 |
| KR | 10-1427186 | 8/2014 |
| KR | 10-1553654 | 10/2015 |
| KR | 10-2016-0036008 | 4/2016 |
| KR | 10-2018-0074537 | 7/2018 |
| KR | 10-2018-0082264 | 7/2018 |
| KR | 10-2019-0103511 | 9/2019 |
| WO | WO 2018/043180 | 3/2018 |
| WO | WO 2019/080679 | 5/2019 |

OTHER PUBLICATIONS

International Search Report dated Dec. 23, 2020 issued in International Application No. PCT/KR2020/009343.
International Search Report dated Dec. 23, 2020 issued in International Application No. PCT/KR2020/008715.
Korean Notice of Allowance dated May 29, 2021 issued in KR Application No. 10-2019-0083998.
U.S. Appl. No. 16/920,082, filed Jul. 2, 2020.
U.S. Appl. No. 16/921,167, filed Jul. 6, 2020.
U.S. Appl. No. 16/925,798, filed Jul. 10, 2020.
U.S. Appl. No. 16/924,848, filed Jul. 9, 2020.
U.S. Appl. No. 16/929,423, filed Jul. 15, 2020.
International Search Report dated Jan. 8, 2021 issued in International Application No. PCT/KR2020/009048.
United States Office Action dated Jul. 15, 2022 issued in co-pending related U.S. Appl. No. 16/920,082.
United States Office Action dated Jul. 15, 2022 issued in co-pending related U.S. Appl. No. 16/921,167.
United States Office Action dated Dec. 2, 2022 issued in co-pending related U.S. Appl. No. 16/929,423.
United States Office Action dated Aug. 18, 2022 issued in co-pending related U.S. Appl. No. 16/929,423.
United States Office Action dated Sep. 1, 2022 issued in co-pending related U.S. Appl. No. 16/925,798.
Japanese Office Action dated Feb. 21, 2023 issued in JP Application No. 2022-500912.

(56) References Cited

OTHER PUBLICATIONS

Japanese Office Action dated Mar. 14, 2023 issued in Application No. 2022-502504.

* cited by examiner (a)

(b)

MOBILE ROBOT USING ARTIFICIAL INTELLIGENCE AND CONTROLLING METHOD THEREOF

CROSS-REFERENCE TO RELATED APPLICATION

This application claims priority under 35 U.S.C. § 119 to Korean Application No. 10-2019-0083998 filed on Jul. 11, 2019, whose entire disclosure is hereby incorporated by reference. This application is also related to application Ser. No. 16/920,082, filed Jul. 2, 2020, application Ser. No. 16/921,167, filed Jul. 6, 2020, application Ser. No. 16/925,798 filed Jul. 10, 2020, and application Ser. No. 16/929,423 filed Jul. 15, 2020, whose entire disclosures are also hereby incorporated by reference.

BACKGROUND

1. Field

The present disclosure relates to the mobile robot and a method for controlling the mobile robot, and more particularly, to a method of detecting the mobile robot using artificial intelligence and corresponding travelling technology.

2. Background

Robots have been developed for industrial use and have been a part of factory automation.

In recent years, the application of robots has been further expanded, medical robots, aerospace robots, and the like have been developed, and home robots that can be used in general homes have also been manufactured. Among these robots, a robot capable of traveling by itself is called the mobile robot. A representative example of the mobile robot used in home is a robot cleaner.

Various technologies for detecting an environment and a user around the robot cleaner through various sensors provided in the robot cleaner are known. In addition, technologies which allow the robot cleaner to learn and map a traveling area by itself and to determine a current position on a map are known. A robot cleaner that travels and cleans the traveling area in a preset manner is known.

In addition, in the prior art (Korean Patent Publication No. 10-2017-0003764), a method of processing a map (grid map) for a cleaning area into a form that is easy for a user to check (such as changing an outline), and cleaning the cleaning area according to a cleaning command input through the map is disclosed.

On the other hand, in the prior art (Korean Patent Registration No. 10-0791384), it is related to a method for classifying areas using a feature point and a mobile cleaning robot using the same, and a technique has been disclosed in which a user can conveniently order cleaning command by dividing areas using feature points from a grid map.

However, in the case of the prior art described above, in a typical indoor environment, a lot of furniture such as a bed, the grid map created by the robot is significantly different from the actual area drawing, and it is difficult for the user to intuitively grasp information about the area.

On the other hand, in the prior art (Korean Patent Publication No. 10-2016-0036008), it is disclosed that a area segmentation point is detected, analyzed, and the map is generated, and the area segmentation point is detected based on the width between pixels.

In addition, there is also a conventional technique in which a region is divided by a structure dividing point or erosion-expansion.

However, when the cleaning is performed by dividing the cleaning area as described above, the segmentation is performed based on the same point as the door. In a home environment, an area such as a room has a simple structure, so a room may be set as one area, but in a complex environment such as an office, there are many narrow areas, so it is highly likely that the segmentation point will not be matched where it is suitable.

In addition, there are many obstacles in one area, and thus it is not suitable for a pattern driving having straightness.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
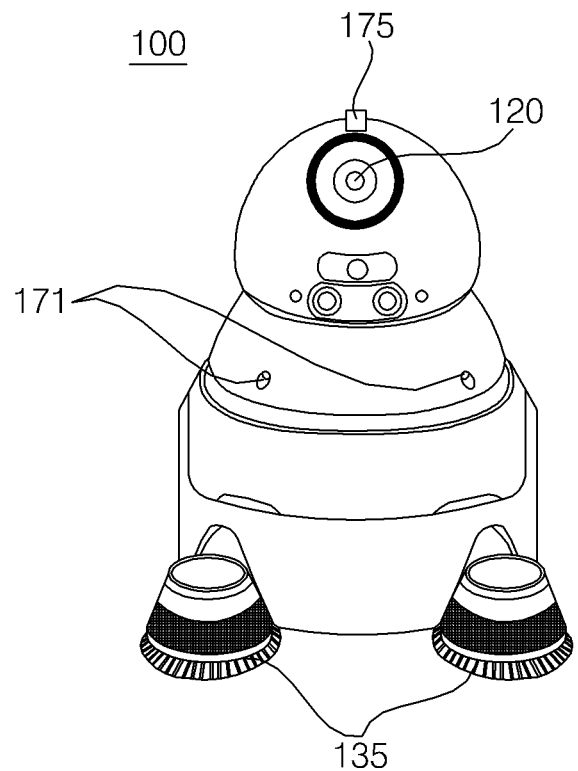
FIG. 1 is a front view of the mobile robot according to an embodiment of the present disclosure.

Hereinafter, embodiments of the present disclosure will be described in detail with reference to the accompanying drawings. However, the present disclosure is not limited to these embodiments and can be modified in various forms.

On the other hand, the suffixes "module" and "part" for the components used in the following description are given simply by considering the ease of writing the present specification, and do not impart a particularly important meaning or role in itself. Therefore, the "module" and the "unit" may be used interchangeably.

Further, in this specification, terms such as first and second may be used to describe various elements, but these elements are not limited by these terms. These terms are only used to distinguish one element from another.

The mobile robot 100 according to an embodiment of the present disclosure means a robot capable of moving itself using a wheel or the like, and may be a home helper robot and a robot cleaner. Hereinafter, referring to the drawings, a robot cleaner having a cleaning function among mobile robots will be described as an example, but the present disclosure is not limited thereto.

The mobile robot means a robot capable of moving itself using wheels or the like. Therefore, the mobile robot may be a guide robot, a cleaning robot, an entertainment robot, a home helper robot, a security robot, and the like, which can move by itself, and the present disclosure is not limited to the type of the mobile robot.

Hereinafter, embodiments of the present disclosure will be described in detail with reference to the accompanying drawings. However, the present disclosure is not limited to these embodiments and can be modified in various forms.

On the other hand, the suffixes "module" and "part" for the components used in the following description are given simply by considering the ease of writing the present specification, and do not impart a particularly important meaning or role in itself. Therefore, the "module" and the "unit" may be used interchangeably.

Further, in this specification, terms such as first and second may be used to describe various elements, but these elements are not limited by these terms. These terms are only used to distinguish one element from another.

The mobile robot 100 according to an embodiment of the present disclosure means a robot capable of moving itself using a wheel or the like, and may be a home helper robot and a robot cleaner. Hereinafter, referring to the drawings, a robot cleaner having a cleaning function among mobile robots will be described as an example, but the present disclosure is not limited thereto.

The mobile robot means a robot capable of moving itself using wheels or the like. Therefore, the mobile robot may be a guide robot, a cleaning robot, an entertainment robot, a home helper robot, a security robot, and the like, which can move by itself, and the present disclosure is not limited to the type of the mobile robot.

FIG. 1 shows an embodiment of the present disclosure, the mobile robot that is a cleaning robot.

The mobile robot 100 may be provided with a cleaning mechanism 135d such as a brush to clean a specific space while moving itself.

The mobile robot 100 includes sensing units 170: 171 and 175 capable of detecting information about the surroundings.

The mobile robot 100 effectively fuses vision-based location recognition using a camera and rider-based location recognition technology using a laser to perform robust location recognition and map generation against environmental changes such as illumination changes and product location changes.

The image acquiring unit 120 photographs a travelling area, and may include one or more camera sensors for acquiring an image outside the main body.

In addition, the image acquisition unit 120 may include a camera module. The camera module may include a digital camera. The digital camera includes at least one optical lens, an image sensor (for example, a CMOS image sensor) composed of a plurality of photodiodes (for example, pixels) imaged by light passing through the optical lens, and a digital signal processor (DSP) that composes an image based on a signal output from photodiodes. The digital signal processor is capable to generate not only a still image but also a moving image composed of frames composed of still images.

In the present embodiment, the image acquisition unit 120 includes a front camera sensor provided to acquire an image in front of the main body, but the location and the photographing range of the image acquisition unit 120 are not necessarily limited thereto.

For example, the mobile robot 100 may include only a camera sensor that acquires an image of the front in the travelling area and perform vision-based location recognition and travelling.

Alternatively, the image acquisition unit 120 of the mobile robot 100 according to an embodiment of the present disclosure may include a camera sensor (not shown) that is disposed obliquely with respect to one surface of the main body and configured to photograph the front side and the top side together. That is, it is possible to photograph both the front side and the top side with a single camera sensor. In this case, the controller 140 may separate the front image and the upper image from the image acquired by the camera based on the angle of view. The separated front image may be used for vision-based object recognition with the image obtained from the front camera sensor. In addition, the separated upper image may be used for vision-based location recognition and travelling with the image acquired from an upper camera sensor.

The mobile robot 100 according to the present disclosure may perform a vision slam that recognizes the current location by comparing surrounding images with image-based pre-stored information or comparing acquired images.

Meanwhile, the image acquisition unit 120 may also include a plurality of front camera sensors and/or upper camera sensors. Alternatively, the image acquisition unit 120 may be provided with a plurality of camera sensors (not shown) configured to photograph the front and the top together.

In the case of this embodiment, a camera is installed on a part of the mobile robot 100 (ex, front, rear, bottom), and the acquired image can be continuously acquired during cleaning. Multiple cameras may be installed for each part to improve photographing efficiency. The image acquired by the camera can be used to recognize the type of material, such as dust, hair, floor, etc. in the space, whether to clean, or when to clean.

The front camera sensor may photograph a situation of an obstacle or a cleaning area existing in the front of the traveling direction of the mobile robot 100.

According to an embodiment of the present disclosure, the image acquisition unit 120 may acquire a plurality of images by continuously photographing the periphery of the main body, and the obtained plurality of images may be stored in a storage unit.

The mobile robot 100 may increase the accuracy of obstacle recognition by using a plurality of images or may increase the accuracy of obstacle recognition by selecting one or more images from a plurality of images and using effective data.

The sensing unit 170 may include a lidar sensor 175 that acquires terrain information outside the main body 110 using a laser.

The lidar sensor 175 outputs the laser to provide information such as a distance, a location direction, and a material of the object that reflects the laser and can acquire terrain information of the travelling area. The mobile robot 100 may obtain 360-degree geometry information using the lidar sensor 175.

The mobile robot 100 according to the embodiment of the present disclosure may grasp the distance, location, and direction of objects sensed by the lidar sensor 175 and generate a map while travelling accordingly.

The mobile robot 100 according to the embodiment of the present disclosure may acquire terrain information of the travelling area by analyzing the laser reception pattern such as a time difference or signal intensity of the laser reflected and received from the outside. In addition, the mobile robot 100 may generate the map using terrain information acquired through the lidar sensor 175.

For example, the mobile robot 100 according to the present disclosure compares the surrounding terrain information acquired from the lidar sensor 175 at the current location with the lidar sensor-based pre-stored terrain information or compares the acquired terrain information to perform a lidar slam that recognizes the current location.

More preferably, the mobile robot 100 according to the present disclosure effectively fuses vision-based location recognition using the camera and the lidar-based location recognition technology using the laser, and it can perform location recognition and map generation that are robust to environmental changes, such as changes in illuminance or changes in the location of the object.

Meanwhile, the sensing unit 170 may include sensors 171 for sensing various data related to the operation and state of the mobile robot 100.

For example, the sensing unit 170 may include an obstacle detection sensor 171 that detects an obstacle in front. In addition, the sensing unit 170 may further include a cliff detection sensor for detecting the presence of a cliff on the floor in the travelling area, and a lower camera sensor for acquiring an image of the floor.

Referring to FIG. 1, the obstacle detection sensor 171 may include a plurality of sensors installed at regular intervals on the outer circumferential surface of the mobile robot 100.

The obstacle detection sensor 171 may include an infrared sensor, an ultrasonic sensor, an RF sensor, a geomagnetic sensor, a Location Sensitive Device (PSD) sensor, and the like.

Meanwhile, the location and type of the sensor included in the obstacle detection sensor 171 may vary depending on the type of the mobile robot 100, and the obstacle detection sensor 171 may include more various sensors.

The obstacle detection sensor 171 is a sensor that detects a distance from an indoor wall or the obstacle, and the present disclosure is not limited to that type but will be described below by using an ultrasonic sensor.

The obstacle detection sensor 171 detects the object, particularly an obstacle, present in the travelling (movement) direction of the mobile robot 100 and transmits obstacle information to the controller 140. That is, the obstacle detection sensor 171 may detect a projecting object, an object in the house, furniture, a wall, a wall edge, and the like, present on a movement path of the mobile robot 100, in the front or side, and transmit the information to the controller 140.

The mobile robot 100 may be provided with a display (not shown) to display a predetermined image such as a user interface screen. In addition, the display may be configured as a touch screen and used as an input means.

In addition, the mobile robot 100 may receive user input through touch, voice input, or the like, and display information on the object and a place corresponding to the user input on the display screen.

The mobile robot 100 may perform an assigned task, that is, cleaning while travelling in a specific space. The mobile robot 100 may perform autonomous travelling that generates a path to a predetermined destination on its own and travels and following travelling that moves while following a person or another robot. In order to prevent the occurrence of a safety accident, the mobile robot 100 can travel while detecting and avoiding the obstacle during movement based on the image data acquired through the image acquisition unit 120 and the detection data obtained from the sensing unit 170.

The mobile robot 100 of FIG. 1 is capable of providing cleaning services in various spaces, for example, spaces such as airports, hotels, marts, clothing stores, logistics, hospitals, and especially large areas such as commercial spaces.

The mobile robot 100 may be linked to a server (not shown) that can manage and control it.

The server can remotely monitor and control the states of the plurality of robots 100 and provide effective service.

The mobile robot 100 and the server may be provided with communication means (not shown) supporting one or more communication standards to communicate with each other. In addition, the mobile robot 100 and the server may communicate with a PC, a mobile terminal, and other external servers. For example, the mobile robot 100 and the server may communicate using a Message Queuing Telemetry Transport (MQTT) method or a HyperText Transfer Protocol (HTTP) method. In addition, the mobile robot 100 and the server may communicate with a PC, a mobile terminal, or another server outside using the HTTP or MQTT method.

In some cases, the mobile robot 100 and the server support two or more communication standards and may use an optimal communication standard according to the type of communication data and the type of devices participating in the communication.

The server is implemented as a cloud server, and a user can use data stored and functions and services provided by the server through the server connected to various devices such as a PC and a mobile terminal.

The user can check or control information about the mobile robot 100 in the robot system through the PC, the mobile terminal, or the like.

In this specification, 'user' is a person who uses a service through at least one robot, an individual customer who purchases or rents a robot and uses it at home, and a manager of a company that provides services to employees or customers using the robot, the employees and the customers using the services provided by the company. Accordingly, the 'user' may include an individual customer (Business to Consumer: B2C) and an enterprise customer (Business to Business: B2B).

The user can monitor the status and location of the mobile robot 100 through the PC, the mobile terminal, and the like, and manage content and a work schedule. Meanwhile, the server may store and manage information received from the mobile robot 100 and other devices.

The mobile robot 100 and the server may be provided with communication means (not shown) supporting one or more communication standards to communicate with each other. The mobile robot 100 may transmit data related to space, objects, and usage to the server.

Here, the data related to the space and object are data related to the recognition of the space and objects recognized by the robot 100, or image data for the space and the object obtained by the image acquisition unit 120.

According to the embodiment, the mobile robot 100 and the server include artificial neural networks (ANN) in the form of software or hardware learned to recognize at least one of the user, a voice, an attribute of space, and attributes of objects such as the obstacle.

According to the embodiment of the present disclosure, the robot 100 and the server may include deep neural networks (Deep) such as Convolutional Neural Network (CNN), Recurrent Neural Network (RNN), and Deep Belief Network (DBN), which are learned by Deep Learning. For example, the deep neural network structure (DNN) such as a convolutional neural network (CNN) may be installed on the controller (see 140 of FIG. 3) of the robot 100.

The server may transmit the updated deep neural network (DNN) structure data to the robot 100 after learning the deep neural network (DNN) based on data received from the mobile robot 100, or data input by the user, and the like. Accordingly, the deep neural network (DNN) structure of artificial intelligence provided by the mobile robot 100 may be updated.

In addition, usage-related data is data obtained according to the use of a predetermined product, for example, data acquired according to the use of the robot 100, and may include usage history data, sensing data obtained from the sensing unit 170, and the like.

The learned deep neural network structure (DNN) may receive input data for recognition, recognize attributes of people, objects, and spaces included in the input data, and output the result.

In addition, the learned deep neural network structure (DNN) may receive input data for recognition, analyze and learn usage-related data of the mobile robot 100, and recognize usage patterns, usage environments, and the like.

Figure 3:
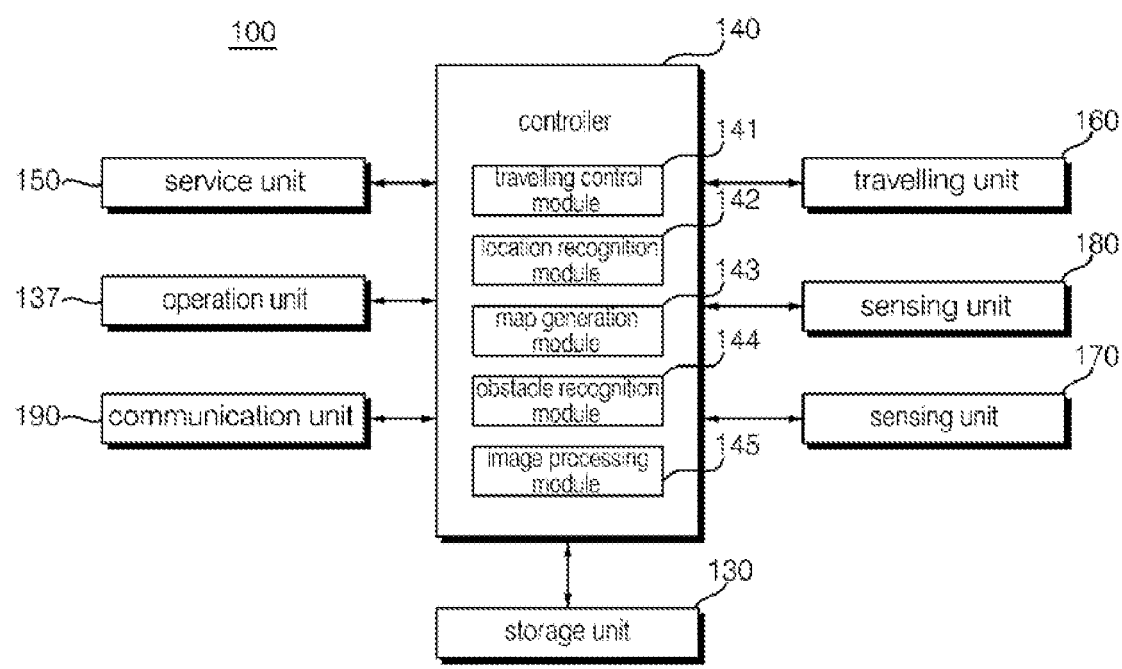
FIG. 3 is a block diagram showing a control relationship between main components of the mobile robot according to the embodiment of the present disclosure.

Meanwhile, data related to space, objects, and usage may be transmitted to the server through a communication unit (see 190 of FIG. 3).

Based on the received data, the server may train the deep neural network (DNN) and then transmit the updated deep neural network (DNN) structure data to the mobile robot 100 for updating.

Accordingly, the mobile robot 100 becomes smarter and provides a user experience (UX) that evolves as it is used.

The robot 100 and the server may also use external information. For example, the server may comprehensively use external information acquired from other linked service servers to provide an excellent user experience.

According to the present disclosure, the mobile robot 100 and/or the server can perform voice recognition, so that the user voice can be used as an input for controlling the robot 100.

Further, according to the present disclosure, the mobile robot 100 can provide a more diverse and active control function to the user by actively providing information or outputting a voice recommending a function or service.

Figure 2:
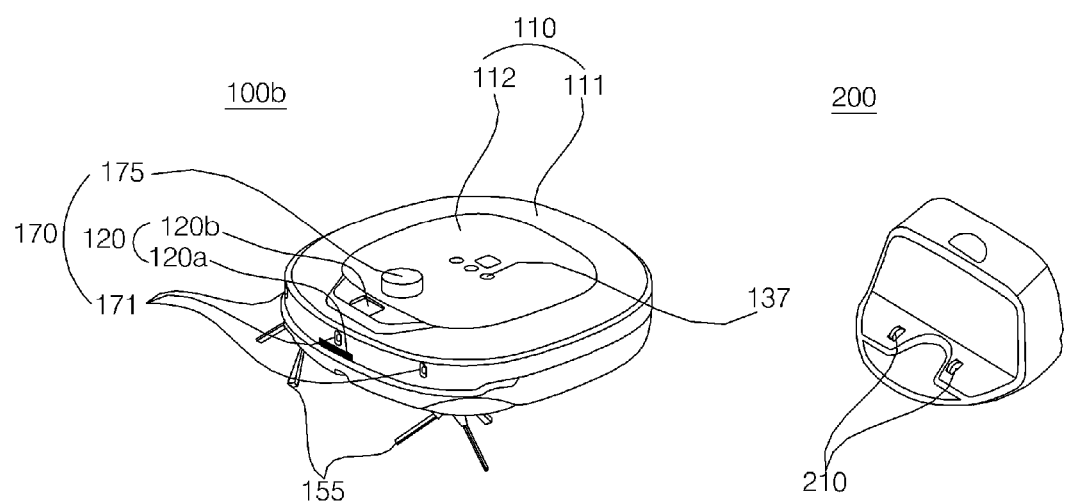
FIG. 2 is a perspective view showing the mobile robot and a charging stand for charging the mobile robot according to another embodiment of the present disclosure.

On the other hand, such the mobile robot 100 may be implemented in the embodiment shown in FIG. 2.

FIG. 2 is a perspective view showing the mobile robot and a charging stand for charging the mobile robot according to another embodiment of the present disclosure, and FIG. 3 is a block diagram showing a control relationship between main components of the mobile robot according to the embodiment of the present disclosure. The block diagram of FIG. 3 is applicable to both the mobile robot 100 of FIG. 1 and the mobile robot 100b of FIG. 2 and will be described below with the configuration of the mobile robot of FIG. 2.

Referring to FIG. 2, the mobile robot 100b includes a travelling unit 160 that moves the main body 110. The travelling unit 160 includes at least one travelling wheel 136 that moves the main body 110. The travelling unit 160 includes a travelling motor (not shown) connected to the travelling wheel 136 to rotate the travelling wheel. For example, the travelling wheels 136 may be provided on the left and right sides of the main body 110, respectively, hereinafter referred to as the left wheel L and the right wheel R, respectively.

The left wheel L and the right wheel R may be driven by one travelling motor, but a left wheel travelling motor driving the left wheel L and a right wheel travelling motor driving the right wheel R may be provided as needed. The travelling direction of the main body 110 can be switched to the left or right side by making a difference in the rotational speeds of the left wheel L and the right wheel R.

The mobile robots 100 and 100b include a service unit 150 for providing a predetermined service. FIGS. 1 and 2 illustrate the present disclosure as an example in which the service unit 150 performs a cleaning operation, but the present disclosure is not limited thereto. For example, the service unit 150 may be provided to provide a user with household services such as cleaning (scrubbing, suction cleaning, mopping, etc.), washing dishes, cooking, laundry, and garbage disposal. As another example, the service unit 150 may perform a security function for detecting external intruders or dangerous situations.

The mobile robots 100 and 100b may move the travelling area and clean the floor by the service unit 150. The service unit 150 includes an inhalation device for inhaling foreign substances, brushes 135 and 155 for performing the brushing, a dust container (not shown) for storing foreign substances collected by the inhalation device or brush, and/or a mop (not shown) for performing mopping.

In the bottom part of the main body 110 of the mobile robot 100b of FIG. 2, an intake port for inhalation of air may be formed, and in the main body 110, an inhalation device (Not shown) that provides inhalation force so that air can be inhaled through the intake port and a dust container (not shown) for collecting dust sucked with air through the intake port may be provided.

The main body 110 may include a case 111 forming a space in which various components constituting the mobile robot 100b are accommodated. An opening for inserting and removing the dust container may be formed in the case 111, and a dust container cover 112 that opens and closes the opening may be rotatably provided with respect to the case 111.

A roll-type main brush having brushes exposed through the intake port, and an auxiliary brush 155 locationed on the front side of the bottom surface of the main body 110 and having a plurality of blades extending radially may be provided. The rotation of these brushes 155 separates dust from the floor in the travelling area, and the dust separated from the floor is sucked through the intake port and collects in the dust container.

The battery supplies not only the driving motor, but also the power required for the overall operation of the mobile robot 100b. When the battery is discharged, the mobile robot 100b may perform travelling to return to the charging stand 200 for charging, and during such return travelling, the mobile robot 100b may detect the location of the charging stand 200 by itself.

The charging stand 200 may include a signal transmission unit (not shown) that transmits a predetermined return signal. The return signal may be an ultrasonic signal or an infrared signal, but is not limited thereto.

The mobile robot 100b of FIG. 2 may include a signal detection unit (not shown) that receives the return signal. The charging stand 200 may transmit the infrared signal through the signal transmission unit, and the signal detection unit may include an infrared sensor that detects the infrared signal. The mobile robot 100b moves to a location of the charging stand 200 according to the infrared signal transmitted from the charging stand 200 and docks the charging stand 200. By the docking, charging is performed between the charging terminal 133 of the mobile robot 100b and the charging terminal 210 of the charging stand 200.

The mobile robot 100b may include the sensing unit 170 that senses information inside/outside the mobile robot 100b.

For example, the sensing unit 170 may include one or more sensors 171 and 175 sensing various types of information about the travelling area, and an image acquiring unit 120 for obtaining image information about the travelling area. According to the embodiment, the image acquisition unit 120 may be separately provided outside the sensing unit 170.

The mobile robot 100b may map the travelling area through the information sensed by the sensing unit 170. For example, the mobile robot 100b may perform vision-based location recognition and map generation based on the ceiling image of the travelling area acquired by the image acquisition unit 120. In addition, the mobile robot 100b may perform location recognition and map generation based on a light detection and ranging (LiDAR) sensor 175 using a laser.

More preferably, the mobile robot 100b according to the present disclosure effectively fuses vision-based location recognition using a camera and laser-based lidar-based location recognition technology, thereby the robot 100b can perform location recognition and map generation that are robust to environmental changes, such as changes in illuminance and location of objects.

Meanwhile, the image acquisition unit 120 photographs the travelling area, and may include one or more camera sensors for acquiring an image outside the main body 110.

In addition, the image acquisition unit 120 may include a camera module. The camera module may include a digital camera. The digital camera includes at least one optical lens and an image sensor (for example, a CMOS image sensor) composed of a plurality of photodiodes (for example, pixels) imaged by light passing through the optical lens, and a digital signal processor (DSP) that composes an image based on a signal output from photodiodes. The digital signal processor can generate not only a still image but also a moving image composed of frames composed of still images.

In this embodiment, the image acquisition unit 120 is provided on the front camera sensor 120a provided to acquire an image in front of the main body 110 and an upper camera sensor 120b located in the upper surface portion of the main body 110 and provided to acquire the image of the ceiling in the travelling area but the location and photographing range of the image acquisition unit 120 are not necessarily limited thereto.

For example, the mobile robot 100b may be equipped with only the upper camera sensor 120b that acquires the image of the ceiling in the travelling area, and perform vision-based location recognition and travelling.

Alternatively, the image acquisition unit 120 of the mobile robot 100b according to the embodiment of the present disclosure may include a camera sensor (not shown) configured disposed inclined with respect to one surface of the main body 110 to photograph the front and the top together. That is, it is possible to photograph both the front side and the top side with a single camera sensor. In this case, the controller 140 may separate the front image and the upper image from the image acquired by the camera based on the angle of view. The separated front image may be used for vision-based object recognition, such as an image obtained from the front camera sensor 120a. In addition, the separated upper image may be used for vision-based location recognition and travelling, such as an image obtained from the upper camera sensor 120b.

The mobile robot 100b according to the present disclosure may perform a vision slam of recognizing the current location by comparing surrounding images with pre-stored information based on images or comparing acquired images.

On the other hand, the image acquisition unit 120 may be provided with a plurality of front camera sensor 120a and/or upper camera sensor 120b. Alternatively, the image acquisition unit 120 may be provided with a plurality of camera sensors (not shown) configured to photograph the front and the top together.

In the case of this embodiment, a camera is installed on a part of the mobile robot (ex, front, rear, and bottom), and the captured image can be continuously acquired during cleaning. Multiple cameras may be installed for each part for photographing efficiency. The image captured by the camera can be used to recognize the type of material such as dust, hair, floor, or the like present in the space, to check whether it is cleaned, or when to clean.

The front camera sensor 120a may photograph a situation of the obstacle existing in the front of the traveling direction of the mobile robot 100b or a cleaning area.

According to the embodiment of the present disclosure, the image acquisition unit 120 may acquire a plurality of images by continuously photographing the surroundings of the main body 110, and the obtained plurality of images may be stored in the storage unit 130.

The mobile robot 100b may increase the accuracy of obstacle recognition by using a plurality of images or may increase the accuracy of obstacle recognition by selecting one or more images from a plurality of images and using effective data.

The sensing unit 170 may include a lidar sensor 175 that acquires terrain information outside the main body 110 using a laser.

The lidar sensor 175 outputs a laser to provide information such as a distance, a location direction, and a material of an object that reflects the laser and can acquire terrain information of the travelling area. The mobile robot 100b may obtain 360-degree geometry information with the lidar sensor 175.

The mobile robot 100b according to the embodiment of the present disclosure may generate the map by grasping the distance, location, and direction of objects sensed by the lidar sensor 175.

The mobile robot 100b according to the embodiment of the present disclosure may acquire terrain information of the travelling area by analyzing a laser reception pattern such as a time difference or signal intensity of a laser reflected and received from the outside. In addition, the mobile robot 100b may generate the map using terrain information acquired through the lidar sensor 175.

For example, the mobile robot 100b according to the present disclosure may perform a lidar slam determining the moving direction by analyzing surrounding terrain information acquired at the current location through the lidar sensor 175.

More preferably, the mobile robot 100b according to the present disclosure may effectively recognize obstacles and generate the map by extracting an optimal moving direction with a small amount of change using a vision-based location recognition using the camera and a lidar-based location recognition technology using the laser and an ultrasonic sensor.

Meanwhile, the sensing unit 170 may include sensors 171, 172, and 179 that sense various data related to the operation and state of the mobile robot.

For example, the sensing unit 170 may include an obstacle detection sensor 171 that detects the obstacle in front. In addition, the sensing unit 170 may further include a cliff detection sensor 172 that detects the presence of a cliff on the floor in the travelling area, and a lower camera sensor 179 that acquires an image of the floor.

The obstacle detection sensor 171 may include a plurality of sensors installed at regular intervals on the outer circumferential surface of the mobile robot 100*b*.

The obstacle detection sensor 171 may include an infrared sensor, an ultrasonic sensor, an RF sensor, a geomagnetic sensor, a Location Sensitive Device (PSD) sensor, and the like.

Meanwhile, the location and type of the sensor included in the obstacle detection sensor 171 may vary depending on the type of the mobile robot, and the obstacle detection sensor 171 may include more various sensors.

The obstacle detection sensor 171 is a sensor that detects a distance from an indoor wall or the obstacle, and the present disclosure is not limited to that type but will be described below by using an ultrasonic sensor.

The obstacle detection sensor 171 detects the object, particularly the obstacle, present in the travelling (movement) direction of the mobile robot and transmits obstacle information to the controller 140. That is, the obstacle detection sensor 171 may detect a projecting object present on a movement path of a mobile robot, in the front or side, a furniture in the house, furniture, a wall, a wall edge, and the like and transmit the information to the controller 140.

At this time, the controller 140 detects the location of the obstacle based on at least two or more signals received through the ultrasonic sensor, and controls the movement of the mobile robot 100*b* according to the detected location of the obstacle to provide an optimal movement path when generating the map.

Depending on the embodiment, the obstacle detection sensor 171 provided on the outer surface of the case 110 may include a transmitter and a receiver.

For example, the ultrasonic sensor may be provided such that at least one transmitter and at least two receivers are staggered. Accordingly, signals can be radiated at various angles, and signals reflected by obstacles can be received at various angles.

Depending on the embodiment, the signal received from the obstacle detection sensor 171 may be subjected to a signal processing such as amplification and filtering, and then a distance and direction to the obstacle may be calculated.

Meanwhile, the sensing unit 170 may further include a travelling detection sensor that detects a travelling operation of the mobile robot 100*b* according to travelling of the main body 110 and outputs operation information. As the travelling sensor, a gyro sensor, a wheel sensor, an acceleration sensor, or the like can be used.

The mobile robot 100*b* may further include a battery detection unit (not shown) that detects a state of charge of the battery and transmits the detection result to the controller 140. The battery is connected to the battery detection unit so that the battery level and charge status are transmitted to the controller 140. The remaining battery power may be displayed on the screen of the output unit (not shown).

In addition, the mobile robot 100*b* includes an operation unit 137 capable of inputting on/off or various commands. Various control commands necessary for the overall operation of the mobile robot 100*b* may be received through the operation unit 137. In addition, the mobile robot 100*b* may include an output unit (not shown), and display reservation information, battery status, operation mode, operation status, and error status, etc.

Referring to FIG. 3, the mobile robot 100*b* includes the controller 140 for processing and determining various information such as recognizing a current location, and the storage unit 130 for storing various data. In addition, the mobile robot 100*b* may further include a communication unit 190 that transmits and receives data to and from other devices.

Among the devices that communicate with the mobile robot 100*b*, the external terminal has an application for controlling the mobile robot 100*b*, and through execution of the application, the mobile robot 100*b* displays the map of the travelling area to be cleaned, and specifies an area to clean a specific area on the map. The user terminal may communicate with the mobile robot 100*b* to display the current location of the mobile robot with the map, and information on a plurality of areas may be displayed. In addition, the user terminal updates and displays the location of the mobile robot according to the movement of the mobile robot.

The controller 140 controls the sensing unit 170, the operation unit 137, and the travelling unit 160 constituting the mobile robot 100*b* to control the overall operation of the mobile robot 100*b*.

The storage unit 130 records various information necessary for the control of the mobile robot 100*b* and may include a volatile or nonvolatile recording medium. The recording medium stores data that can be read by a microprocessor and is not limited to the type or implementation method.

In addition, the map for the travelling area may be stored in the storage unit 130. The map may be input by the user terminal, the server, or the like capable of exchanging information with the mobile robot 100*b* through wired or wireless communication or may be generated by the mobile robot 100*b* learning by itself.

The location of the rooms in the travelling area may be displayed on the map. In addition, the current location of the mobile robot 100*b* may be displayed on the map, and the current location of the mobile robot 100*b* on the map may be updated in the travelling process. The external terminal stores the same map as the map stored in the storage unit 130.

The storage unit 130 may store cleaning history information. Such cleaning history information may be generated each time cleaning is performed.

The map for the travelling area stored in the storage unit 130 includes a navigation map used for travelling during cleaning, a slam (Simultaneous localization and mapping) map used for location recognition, an obstacle, and the like. If it hits, it may be a learning map stored the corresponding information when an obstacle is encountered and use it for cleaning for learning, a global location map used for global location recognition, and an obstacle recognition map in which information about the recognized obstacle is recorded, and the like.

Meanwhile, as described above, maps may be separately stored and managed in the storage unit 130 for each use but the map may not be clearly classified for each use. For example, a plurality of pieces of information may be stored in one map for use in at least two or more purposes.

The controller 140 may include a travelling control module 141, a location recognition module 142, a map generation module 143, and an obstacle recognition module 144.

The travelling control module 141 controls travelling of the mobile robot 100*b*, and controls travelling of the travelling unit 160 according to the travelling setting. In addition, the travelling control module 141 may grasp the travelling route of the mobile robot 100*b* based on the operation of the travelling unit 160. For example, the travelling control module 141 can grasp the current or past moving speed, the distance traveled, etc. of the mobile robot 100b, and also grasp the history of changing the current or past direction based on the rotational speed of the travelling wheel. Based on the travelling information of the mobile robot 100b identified, the location of the mobile robot 100b on the map may be updated.

The map generation module 143 may generate the map of the travelling area. The map generation module 143 may process an image acquired through the image acquisition unit 120 to generate the map. For example, the map corresponding to the travelling area and the cleaning map corresponding to the cleaning area can be generated.

In addition, the map generation module 143 may recognize the global location by processing the image acquired through the image acquisition unit 120 at each location and linking it with the map.

In addition, the map generation module 143 may generate the map based on information obtained through the lidar sensor 175, and recognize a location based on the information obtained through the lidar sensor 175 at each location.

More preferably, the map generation module 143 may generate the map and perform location recognition based on information obtained through the image acquisition unit 120 and the lidar sensor 175.

The location recognition module 142 estimates and recognizes the current location. The location recognition module 142 uses the image information of the image acquisition unit 120 to grasp the location in connection with the map generation module 143 and the location recognition module 142 may estimate and recognize the current location even though the location of the mobile robot 100b suddenly changes.

The mobile robot 100b is capable of recognizing the location during continuous travelling through the location recognition module 142, and it is possible to learn the map and estimate the current location though the travelling control module 141, the map generation module 143, and the obstacle recognition module 144 without the location recognition module 142.

The mobile robot 100b acquires the acquired image through the image acquisition unit 120 at an unknown current location. Various features such as lights, edges, corners, blobs, and ridges located on the ceiling are identified through the image.

As such, the controller 140 may classify the travelling area and generate the map composed of a plurality of regions, or recognize the current location of the main body 110 based on the pre-stored map.

In addition, the controller 140 may fuse the information obtained through the image acquisition unit 120 and the lidar sensor 175 to generate the map and perform location recognition.

When the map is generated, the controller 140 may transmit the generated map to the external terminal, the server, or the like through the communication unit 190. Also, as described above, the controller 140 may store the map in the storage unit 130 when the map is received from the external terminal, the server, or the like.

In addition, when the map is updated while travelling, the controller 140 transmits the updated information to the external terminal so that the map stored in the external terminal and the mobile robot 100b is the same. As the map stored in the external terminal and the mobile robot 100b remains the same, for the cleaning command from the mobile terminal, the mobile robot 100b can clean the designated area, and the current location of the mobile robot 100b can be displayed on the external terminal.

At this time, the map is divided into a plurality of areas, and may include information on obstacles in the area.

When the cleaning command is input, the controller 140 determines whether the location on the map and the current location of the mobile robot match. The cleaning command may be input from a remote control, an operation unit or the external terminal.

If the current location does not match the location on the map, or if the current location cannot be confirmed, the controller 140 recognizes the current location and restores the current location of the mobile robot 100b, and then the controller 140 may be control to move the travelling unit 160 to the designated area based on the current location.

If the current location does not match the location on the map, or if the current location cannot be confirmed, the location recognition module 142 analyzes the acquired image from the image acquisition unit 120 and/or the terrain information acquired from the lidar sensor 175 and estimates the current location based on the map. In addition, the obstacle recognition module 144 or the map generation module 143 can also recognize the current location in the same way.

After recognizing the location and restoring the current location of the mobile robot 100b, the travelling control module 141 calculates a travelling route from the current location to the designated area and controls the travelling unit 160 to move to the designated area.

When receiving the cleaning pattern information from the server, the travelling control module 141 may divide the entire travelling area into a plurality of areas and set one or more areas as designated areas according to the received cleaning pattern information.

The travelling control module 141 processes the map generated from the map generating module 143 and divides the map into a plurality of detailed area. The travelling control module 141 divides the expanded detailed area from the boundary loop connected to nodes having similar distance levels based on the distance map from the topology node to the obstacle. At this time, the detailed area to be divided may have a quadrangular shape, and the mobile robot 100 may be defined as a region that can travel at a time.

In addition, the travelling control module 141 may calculate the travelling route according to the received cleaning pattern information, travel along the travelling route, and perform cleaning.

When the cleaning for the set designated area is completed, the controller 140 may store a cleaning record in the storage unit 130.

In addition, the controller 140 may transmit the operation state or the cleaning state of the mobile robot 100b to the external terminal or the server at a predetermined cycle through the communication unit 190.

Accordingly, the external terminal displays the location of the mobile robot 100b along with the map on the screen of the running application based on the received data, and also outputs information about the cleaning state.

The mobile robot 100b according to the embodiment of the present disclosure moves in one direction until an obstacle or a wall surface is sensed, and when the obstacle recognition module 144 recognizes the obstacle, the robot 100b may determine travelling patterns such as straight and rotating.

For example, if the recognized obstacle attribute is a kind of obstacle that can be passed, the mobile robot 100b may continue to go straight. Or, if the attribute of the recognized obstacle is an obstacle that cannot be passed, the mobile robot 100*b* rotates to move a certain distance, and then moves to a distance in which the obstacle is detected in the opposite direction of the initial movement direction to travel in a zigzag form.

The mobile robot 100*b* according to an embodiment of the present disclosure may perform human or object recognition, and avoidance based on machine learning.

The controller 140 may include the obstacle recognition module 144 that recognize an obstacle previously learned by machine learning from an input image, and the travelling control module 141 that controls the travelling of the travelling unit 160 based on the attribute of the obstacle recognized.

The obstacle recognition module 144 may include an artificial neural network (ANN) in the form of software or hardware in which the attributes of the obstacle are learned.

For example, the obstacle recognition module 144 may include a deep neural network (DNN) such as a Convolutional Neural Network (CNN), a Recurrent Neural Network (RNN), or a Deep Belief Network (DBN) trained by Deep Learning.

The obstacle recognition module 144 may determine the attribute of the obstacle included in input image data based on weights between nodes included in the deep neural network (DNN).

Meanwhile, the mobile robot 100*b* may further include an output unit 180 to display predetermined information as an image or output it as sound.

The output unit 180 may include a display (not shown) that displays information corresponding to the user's command input, a processing result corresponding to the user's command input, an operation mode, an operation state, and an error state.

According to an embodiment, the display may be configured as a touch screen by forming a mutual layer structure with a touch pad. In this case, the display composed of the touch screen may be used as an input device capable of inputting information by a user's touch in addition to the output device.

In addition, the output unit 180 may include an audio output unit (not shown) that outputs an audio signal. Under the control of the controller 140, the sound output unit may output an alert message such as a warning sound, an operation mode, an operation state, an error state, information corresponding to a user's command input, and a processing result corresponding to a user's command input as sound. The audio output unit may convert the electrical signal from the controller 140 into an audio signal and output the converted audio signal. To this end, a speaker or the like may be provided.

Hereinafter, a control method for processing maps of the mobile robots 100 and 100*b* of FIG. 1 or 2 having the configuration diagram of FIG. 3 will be described.

Figure 4:
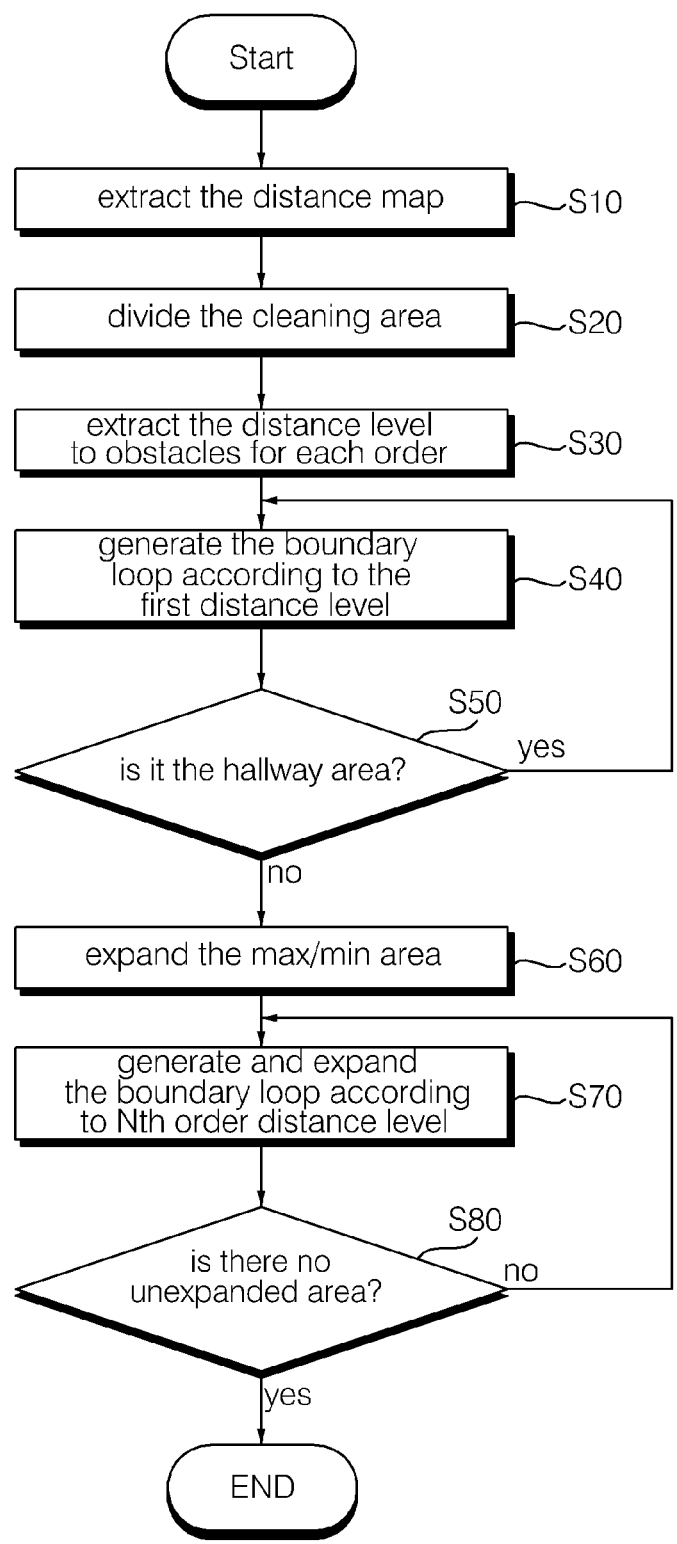
FIG. 4 is a flowchart illustrating a method for controlling the mobile robot according to the embodiment of the present disclosure.

FIG. 4 is a flowchart illustrating a control method of the mobile robot according to an embodiment of the present disclosure, and FIGS. 5 to 9 are views for reference to the description of the control method of FIG. 4.

Referring to FIG. 4, the mobile robot 100 according to an embodiment of the present disclosure extracts the distance map stored by the command of the controller 140 (S10).

Figure 5:
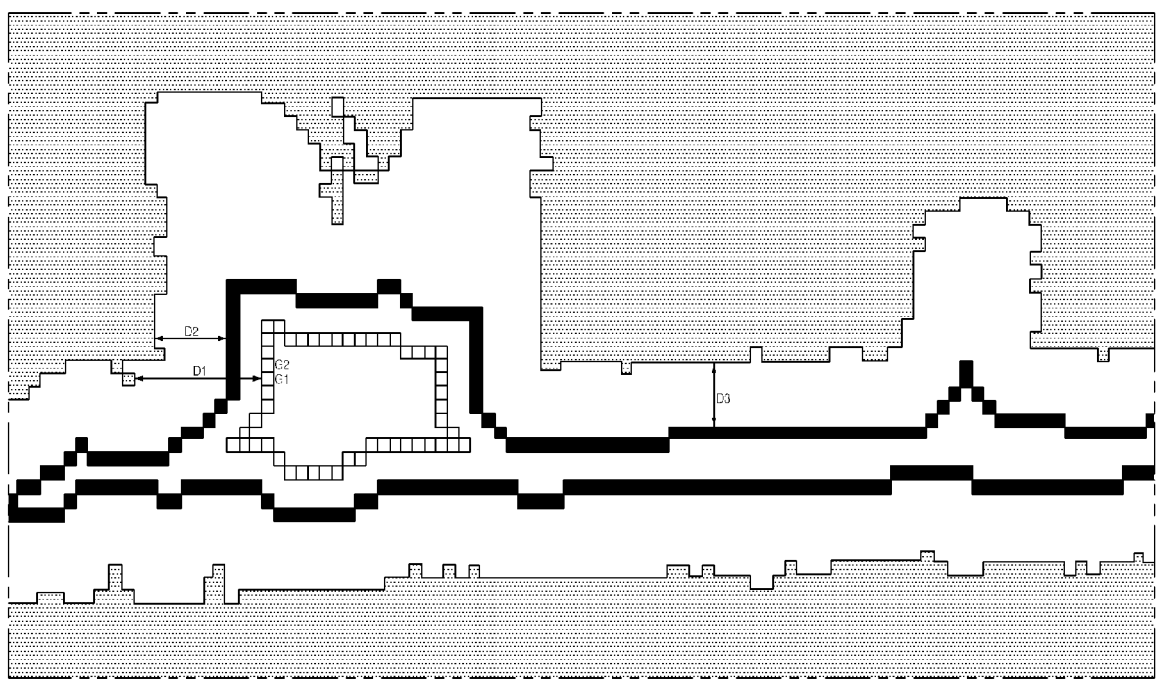
FIGS. 5 to 9 are views referred to for explanation of the method for controlling of FIG. 4.

At this time, the distance map may be binarization data as shown in FIG. 5 and may indicate whether the obstacle exists or not.

In this case, the pixel at the point where the obstacle is present may be displayed as 1, and the pixel at the point where the obstacle does not exist may be displayed as 0.

In this distance map, a driving node that the mobile robot 100 traveled while forming the distance map may be displayed as a topology node.

The topology node indicates a point where the mobile robot 100 is located at regular time intervals, and the obstacle detected at a corresponding node of the mobile robot 100 is represented by a pixel representing 1.

At this time, the pixel at the point, where the obstacle does not exist, of the distance map includes information on the distance from the obstacle.

Next, the controller 140 divides the corresponding cleaning area into detailed areas (S20).

Specifically, the distance information of each pixel is read from the distance map, and a distance level is extracted per step (S30).

For example, when the distance map is formed as shown in FIG. 5, the closer the obstacle is, the smaller the distance information is, and at this time, the distance information of the pixel located in the center has the largest value.

Since such distance information may have different values depending on the boundary formed by the obstacle, they may have different distance information even if they are located in the same horizontal or column.

Therefore, the distance information having the largest value and the number of pixels having each distance information value are read together to set a reference distance level.

For example, when the distance information of the largest value is 15, when the number of pixels having 15 as distance information is 2, 15 is not recognized as the distance level.

Among the distance information having the value less than 15, distance information in which the number of corresponding pixels is greater than or equal to a threshold value may be extracted.

For example, when pixels below the threshold meet 15 to 10 pixels and the number of pixels having distance information of 9 is greater than or equal to the threshold, 9 may be set as the first distance level D1.

Next, among the values smaller than the first distance level D1, distance information having a number of pixels equal to or greater than a threshold value may be set as the second distance level D2.

In this order, a plurality of distance levels may be set, for example, three distance levels may be set.

At this time, the controller 140 generates the boundary loop according to the first distance level D1 (S40).

Figure 6:
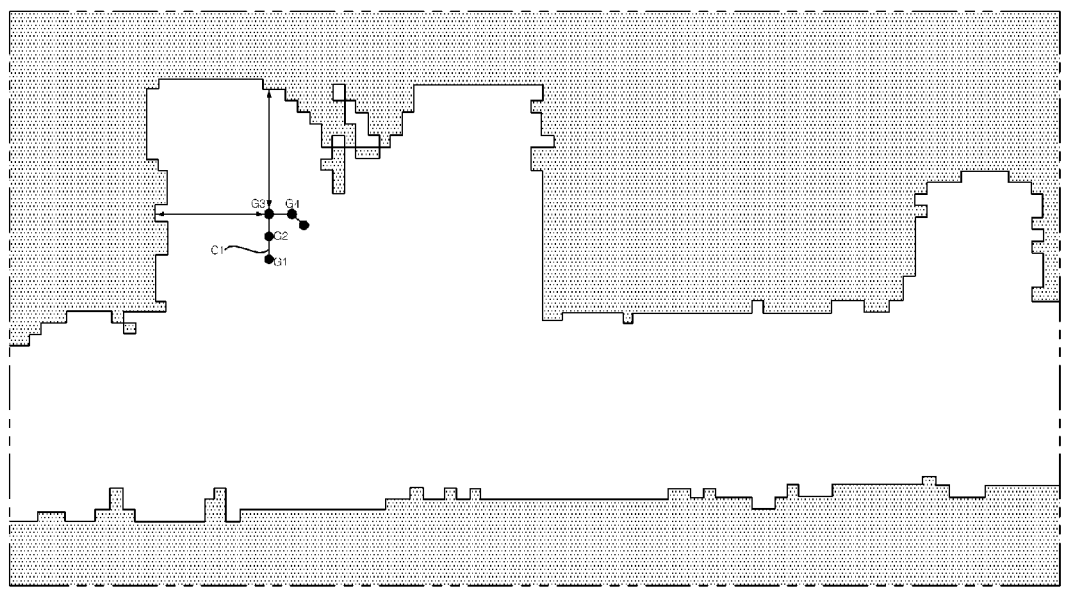

Specifically, as illustrated in FIG. 6, the pixel having the first distance level D1 at a starting position is set as a first node G1 and the controllers 140 explores pixels having the same first distance level D1 around the first node G1.

The pixel at the shortest distance having the first distance level D1 around the first node G1 is set as the second node G2, and the pixel at the shortest distance having the first distance level D1 around the second node G2 is set as the third node G3, and the above operation is repeated to continuously define neighboring pixels having the first distance level D1.

When a plurality of nodes are defined in this way, as shown in FIG. 6, a first boundary loop C1 connecting between each node is formed.

That is, when forming the first boundary loop C1, the first node G1 is connected to the second node G2, and the second node G2 is connected to the third node G3 while the calculation process in which the first boundary loop C1 is extended is repeated.

At this time, when two consecutive nodes are connected, it is determined whether the corresponding space is a hallway (S50). That is, it is determined whether pixels having the same distance information are continuously searched in the same horizontal or column.

Figure 7:
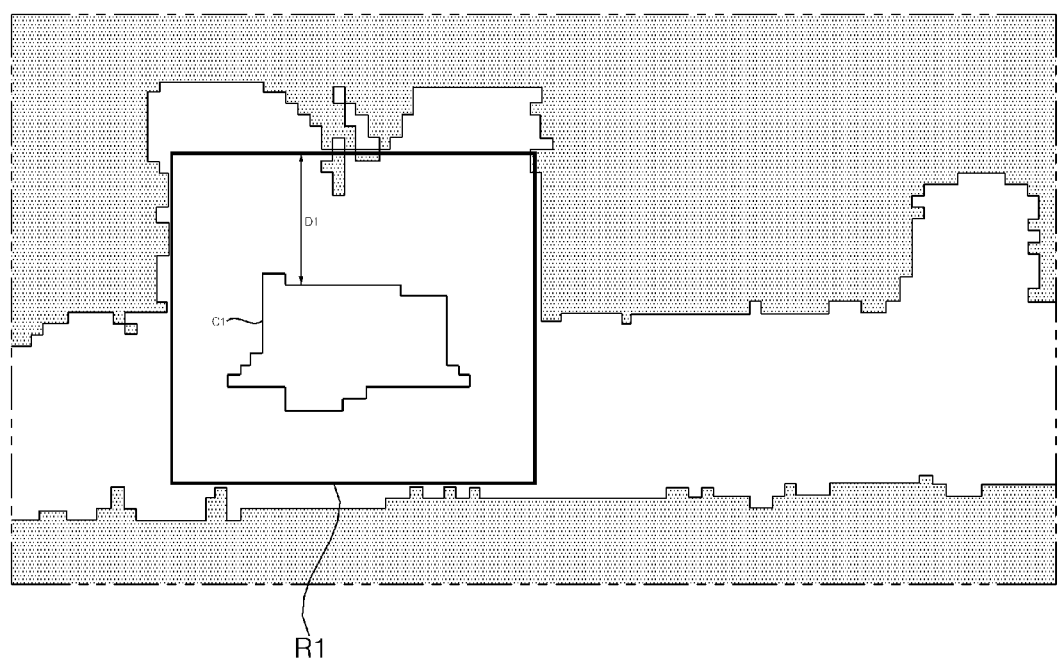

As such, when the corresponding area is not the hallway, the first boundary loop C1 is formed as shown in FIG. 7 through the connection of neighboring nodes to form a closed curve.

When the line connecting the nodes located at the first distance level D1 from the obstacle forms the closed loop as shown in FIG. 7, the controller 140 performs area expansion from the first boundary loop C1 toward the obstacle (S60).

At this time, the area expansion from the first boundary loop C1 may proceed based on the first distance level D1, and the contour of the expanded area is eroded to have a rectangle.

That is, when some areas protrude without forming the rectangle, the area is eroded to form a side of the rectangle to define the largest rectangle that can be included in the cleaning area.

At this time, when the sides of all the squares are within the boundary pixels forming the obstacle to satisfy the maximum size square, if only a predetermined number of pixels are recessed from the maximum size square, the corresponding pixel may be expanded to satisfy the square.

At this time, the corresponding pixel may be marked so that it can be controlled to be careful when the mobile robot 100 is running.

As described above, the rectangular detailed area R1 of the region in which the first boundary loop C1 forms the closed loop among the regions of the distance map is divided with respect to the first distance level D1.

Next, for the region in which the first boundary loop C1 forming the closed loop for the first distance level D1 is not formed, for the second distance level D2 smaller than the first distance level D1, the boundary loop is formed (S70).

That is, for the second distance level D2 of FIG. 5, the node having the same second distance information is searched, and each node is connected to form the second boundary loop C2 for the second distance level D2.

Figure 8:
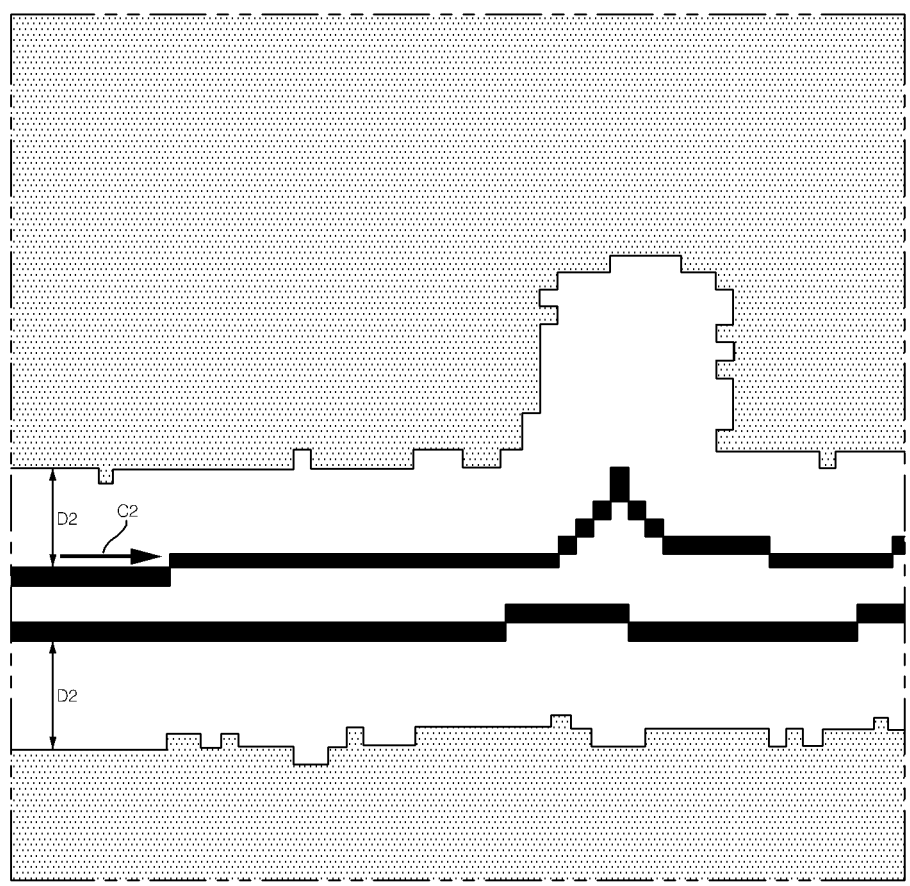

At this time, when the corresponding area satisfies the hallway area as shown in FIG. 8, the number of pixels having the same distance information may be counted to divide the areas R2, R3, R4, . . . into a predetermined length.

At this time, in the case of the hallway area, if there is a portion where the second boundary loop C2 has an inflection point, the area may be divided based on the inflection point.

In this case, if it is determined that the hallway area it may correspond to an aisle in an office, and in the case of the aisle made of a chair or a desk rather than a wall aisle, the aisle may be formed with different distance information.

In the case of having different distance information as described above, it is possible to divide the cleaning area to minimize the uncleaned area by dividing at the inflection point of the distance information.

Figure 9:
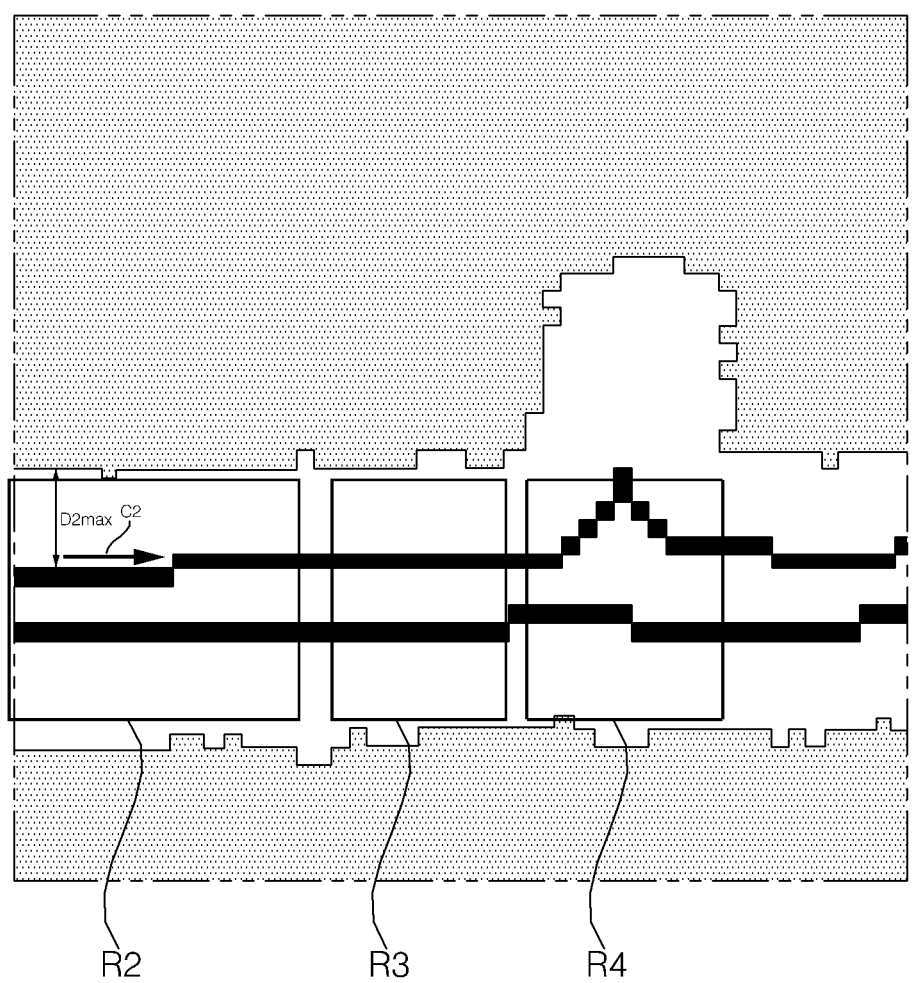

Therefore, even in the case of FIG. 9 in which the hallway areas are continuously connected, it can be divided into detailed areas R2, R3, R4 . . . so as to have different rectangles based on some inflection points.

Next, the controller 140 of the mobile robot 100 may perform the same operation on the third distance level D3 to divide the cleaning area into detailed areas having a plurality of squares.

If it is determined that there is no unexpanded area, that is, when it is determined that all of the cleaning areas are divided into the rectangular detailed area, the controller 140 ends the area division of the distance map and stores the corrected distance map including the information in the storage unit 150 (S80).

The mobile robot 100 may control the travelling unit 160 to perform cleaning for each detailed area of the cleaning area based on the corrected distance map.

Figure 10:
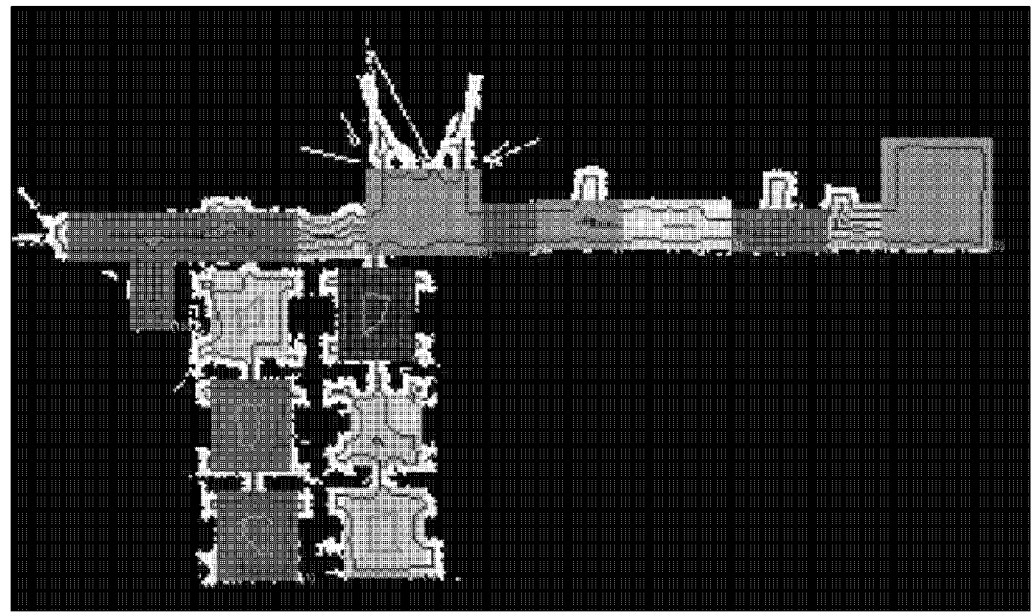
FIG. 10 is a view showing a cleaning area partitioned according to an embodiment of the present disclosure.
Figure 10:
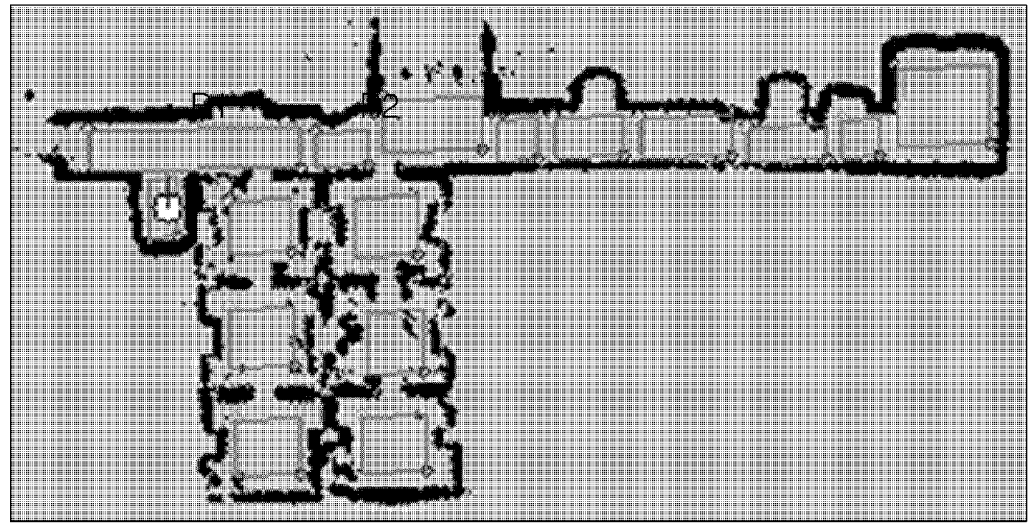

FIG. 10 is a view showing a cleaning area partitioned according to an embodiment of the present disclosure.

In the case of a large-area such as the office area as shown in FIG. 10A, hallway areas having different distances from each other are continuously formed by furniture such as a partition or a desk or chair.

In the case that the mobile robot 100 cleans the large area, such as the office area, when performing continuous travelling through the distance map through preceding cleaning, the mobile robot 100 must repeatedly travel an unnecessary path or a lot of uncleaned areas are generated.

Accordingly, by filtering is performed by setting each distance level according to the distance from the obstacle as in the present disclosure and dividing the boundary loop formed through the filtering into detailed areas of the rectangle having the maximum value, a calibrated distance map as shown in FIG. 10B can be generated.

Through this calibrated distance map, the mobile robot 100 may clean the inside of the rectangle of the corresponding detailed area without the uncleaned area through the optimized driving mode such as the zigzag mode or the edge mode. At this time, the mobile robot 100 may clean the entire cleaning area in the order of cleaning the neighboring divided areas after independently ending the cleaning of one divided area.

Therefore, the connection between divided areas is cut off, and the unclean area can be minimized by performing driving with distance information optimized for each area.

The mobile robot 100 according to the present disclosure is not limited to the configuration and method of the embodiments described as described above, the embodiments are all or part of each embodiment is optional so that various modifications can be made It may be configured in combination.

Likewise, although the operations are depicted in the drawings in a particular order, it should not be understood that such operations should be performed in the particular order shown or in sequential order, or that all shown actions should be performed in order to obtain the desired result. In certain cases, multitasking and parallel processing may be advantageous.

Meanwhile, the control method of the mobile robot according to the embodiment of the present disclosure may be implemented as a code readable by a processor on a recording medium readable by the processor. The processor-readable recording medium includes all kinds of recording devices in which data that can be read by the processor are stored. It also includes those implemented in the form of carrier waves such as transmission over the Internet. In addition, the processor-readable recording medium may be distributed over a networked computer system so that the processor-readable code is stored and executed in a distributed manner.

In addition, although the preferred embodiments of the present disclosure have been illustrated and described above, the present disclosure is not limited to the specific embodiments described above, and the technical field to which the present disclosure pertains without departing from the gist of the present disclosure claimed in the claims. In addition, various modifications can be made by those skilled in the art, and these modifications should not be individually understood from the technical idea or prospect of the present disclosure.

A first object is to provide an area division optimized for the mobile robot traveling in a straight line by dividing the area in a map showing a cleaning area.

The second object is to provide the area division capable of minimizing the complicated movement path of the mobile robot by separating the area in the commercial space such as a large-sized office space.

Meanwhile, the office space is divided into narrow spaces and used by partition. In the case of such a separated space, the traveling path of the mobile robot becomes complicated, and the possibility of collision with the obstacle increases. The third object of the present disclosure is to provide a method for minimizing changes by minimizing the cleaning area having a bending path (as ㄱ-shaped) when dividing the cleaning area into a plurality of areas.

In addition, the fourth object is to provide a control method capable of minimizing the movement of the mobile robot for processing the uncleaned area by using a topology node and a distance map when dividing the cleaning area.

In an aspect, there is provided the mobile robot including: a traveling unit configured to move a main body; a cleaning unit configured to perform a cleaning function; a sensing unit configured to sense a surrounding environment; an image acquiring unit configured to acquire an image outside the main body; and a controller configured to generate a distance map indicating distance information from an obstacle for a cleaning area based on information detected and the image through the sensing unit and the image acquiring unit, divide the cleaning area into a plurality of detailed areas according to the distance information of the distance map and control to perform cleaning independently for each of the detailed areas.

The distance map is composed of a plurality of pixels, and each pixel includes distance information from an obstacle.

The controller selects a plurality of distance levels for the distance information and forms a boundary loop connecting the pixels to each other according to the plurality of distance levels.

The plurality of distance levels are defined as distance information in which the number of pixels having the same distance information is equal to or greater than a threshold value.

For each of the distance levels, the controller searches for pixels having the distance level and connects the searched pixels to neighboring pixels to form the boundary loop.

The controller forms the boundary loops in the order in which the distance levels are large.

The controller extends the boundary loop toward the obstacle to form the detailed area having a rectangular shape.

The controller cuts the pixel out of the rectangle or expands the pixel recessed in the rectangle to form a maximum rectangle included in the cleaning area.

When the cleaning area is a hallway area, the controller forms the detailed area by cutting the hallway area to a predetermined distance.

The controller controls the travelling unit to travel in a zigzag mode with respect to the detailed area.

In another aspect, there is provided a method of controlling the mobile robot to perform cleaning while moving a main body, the method comprising: performing a preceding cleaning in a cleaning area, obtaining a detection signal through a sensing unit, and photographing surrounding environment through an image acquiring unit to obtain image data; generating a distance map indicating distance information from an obstacle to the cleaning area based on the detection signal and the image data; and dividing the cleaning area into a plurality of detailed areas according to the distance information of the distance map.

The distance map is composed of a plurality of pixels, and each pixel includes distance information from the obstacle in the step of the generating the distance map.

The step of the dividing the cleaning area comprises: selecting a plurality of distance levels for the distance information, and forming a boundary loop connecting the pixels to each other according to the plurality of distance levels.

The plurality of distance levels are defined as distance information in which the number of pixels having the same distance information is equal to or greater than a threshold value in the step of the dividing the cleaning area.

The step of the dividing the cleaning area comprises: for each of the distance levels, searching for pixels having the distance level and connecting the searched pixels to neighboring pixels to form the boundary loop.

The step of the dividing the cleaning area is forming the boundary loops in the order in which the distance levels are large.

The step of the dividing the cleaning area comprises: extending the boundary loop toward the obstacle to form the detailed area having a rectangular shape.

In the step of the dividing the cleaning area, the pixel out of the rectangle is cut or the pixel recessed in the rectangle is expanded to form a maximum rectangle included in the cleaning area.

When the cleaning area is a hallway area, the detailed area is formed by cutting the hallway area to a predetermined distance.

The method further comprises; controlling travelling unit to travel in a zigzag mode with respect to the detailed area.

According to at least one of the embodiments of the present disclosure, the area division is optimized for the mobile robot traveling in a straight line by dividing the area in a map showing a cleaning area.

In addition, it is possible to minimize the complicated movement path of the mobile robot by separating the area in the commercial space such as a large-sized office space, and minimize changes by minimizing the cleaning area having a bending path (as ㄱ-shaped).

In addition, it is possible to minimize the movement of the mobile robot for processing the uncleaned area by using a topology node and a distance map when dividing the cleaning area.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

DESCRIPTION OF CODES

Mobile robot: 100, 100*b*
Body: 110
Control panel: 137
Controller: 140
Service unit: 150
Travelling unit: 160
Sensing unit: 170
Communication unit: 190

What is claimed is:

1. A mobile robot comprising:
a traveling wheel configured to move a main body of the mobile robot;
a cleaning mechanism configured to perform a cleaning function;
a sensor configured to collect sensor information about a surrounding environment of the mobile robot;
a camera configured to acquire an image of a region outside the main body; and
a controller configured to
generate a distance map indicating distance information from an obstacle in a cleaning area based on the sensor information and the image,
divide the cleaning area into a plurality of areas according to the distance information of the distance map, and
control the mobile robot to perform cleaning independently in each of the areas,
wherein the distance map includes a plurality of pixels, and each pixel is associated with respective distance information from the obstacle,
wherein the controller determines a plurality of distance levels for the distance information and forms a boundary loop connecting one or more of the pixels to each other according to the plurality of distance levels,
wherein each of the plurality of distance levels includes at least a threshold number of the pixels having corresponding distance information values, and
wherein for each of the distance levels, the controller identifies ones of the pixels having the distance level and connects the identified ones of the pixels to one or more neighboring ones of the pixels to form the boundary loop.

2. The mobile robot of claim 1, wherein the controller forms the boundary loops in order of increasing values of the distance levels.

3. The mobile robot of claim 2, wherein the controller extends one of the boundary loops toward the obstacle to form the one of areas in a rectangular shape.

4. The mobile robot of claim 3, wherein the controller removes one of the pixels from the rectangle or expands one of the pixels recessed in the rectangle to form a maximum rectangle included in the cleaning area.

5. The mobile robot of claim 4, wherein when the cleaning area is a hallway area, the controller forms one of the areas by cutting the hallway area to a predetermined distance.

6. The mobile robot of claim 1, wherein the controller controls the travelling wheel so that the main body of the robot travels in a zigzag mode with respect to the areas.

7. A method of controlling of a mobile robot, the method comprising:
obtaining, by a controller, sensing data and image data related to a region;

generating, by the controller, a distance map indicating distance information from an obstacle in the region based on the sensor data and the image data;

dividing, by the controller, the region into a plurality of areas according to the distance information of the distance map, and controlling, by the controller, a travelling wheel of the mobile robot to perform cleaning dependently in each of the areas, wherein the distance map includes a plurality of pixels, and each pixel is associated with respective distance information from the obstacle, and wherein dividing the region includes:
  determining a plurality of distance levels including at least a threshold number of the pixels having corresponding distance information values,
  for each of the distance levels, identifying ones of the pixels having the distance level, and
  connecting the identified ones of the pixels to neighboring ones of the pixels to form a boundary loop.

8. The method of claim 7, wherein dividing the region includes:
  forming the boundary loops in the order of increasing values of the distance levels.

9. The method of claim 8, wherein dividing the region includes:
  extending the boundary loop toward the obstacle to form one of the areas with a rectangular shape.

10. The method of claim 9, wherein dividing the region includes removing one of the pixels from the rectangle or expanding one of the pixels recessed in the rectangle to form a maximum rectangle included in the region.

11. The method of claim 10, wherein, when the region is a hallway area, one of the areas is formed by cutting the hallway area to a predetermined distance.

12. The method of claim 7, further comprising:
  controlling the mobile robot to travel in a zigzag mode with respect to the one of the areas.

* * * * *